J. M. DODGE.
CONVEYER.
No. 11,549. Reissued June 23, 1896
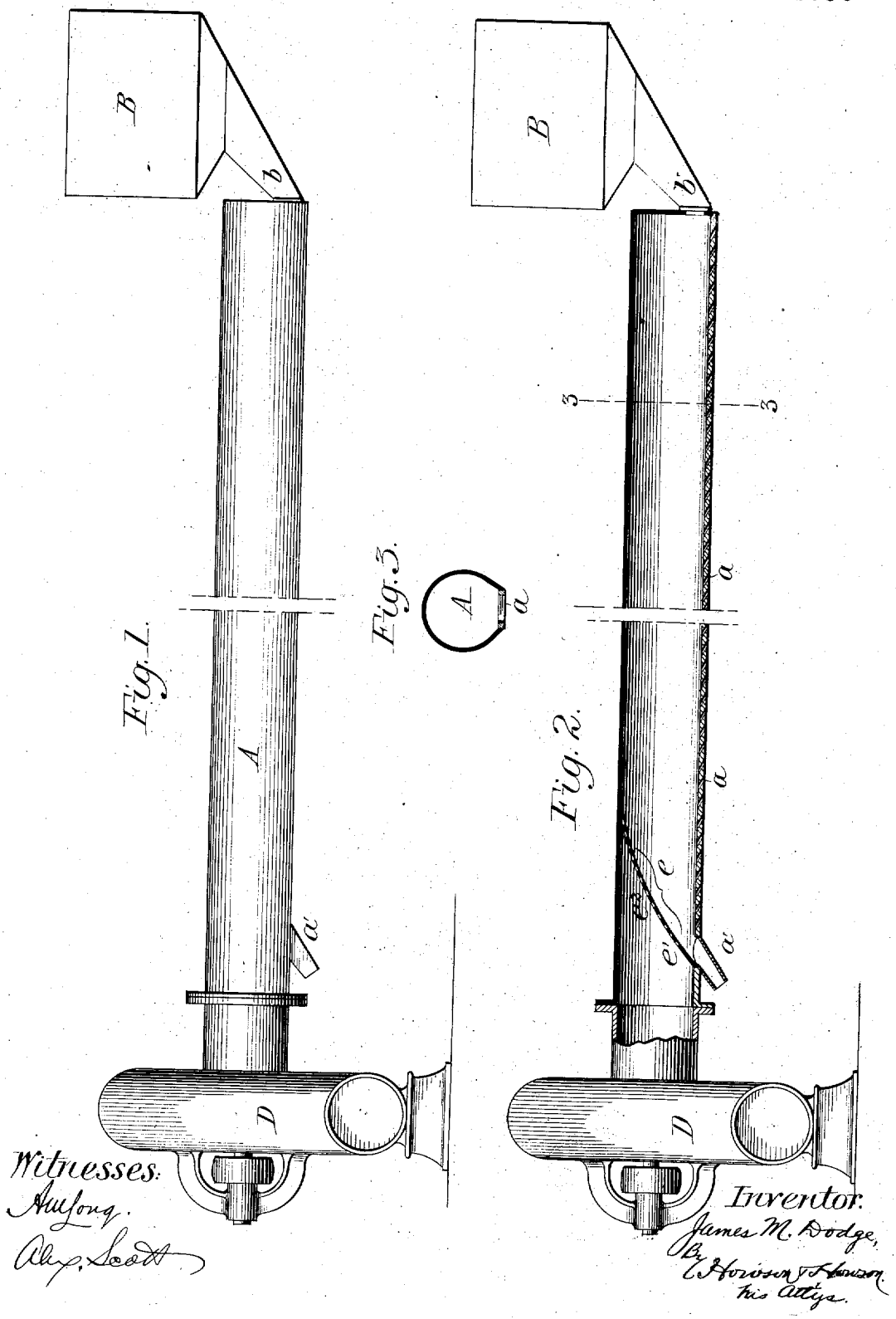
Witnesses:
Am Long.
Alex. Scott
Inventor:
James M. Dodge,
By Hopkinson & Hopkinson
his Attys.

UNITED STATES PATENT OFFICE.

JAMES M. DODGE, OF PHILADELPHIA, PENNSYLVANIA, ASSIGNOR TO THE AIR CONVEYOR COMPANY, OF SAME PLACE AND CAMDEN, NEW JERSEY.

CONVEYER.

SPECIFICATION forming part of Reissued Letters Patent No. 11,549, dated June 23, 1896.

Original No. 557,059, dated March 24, 1896. Application for reissue filed May 11, 1896. Serial No. 591,184.

*To all whom it may concern:*

Be it known that I, JAMES M. DODGE, a citizen of the United States, residing in Philadelphia, Pennsylvania, have invented certain Improvements in Conveyers, (suction,) of which the following is a specification.

My invention is based on the patent granted to me on the 20th day of August, 1895, No. 545,013, for improvements in the process of and apparatus for conveying material.

The object of my present invention is to convey by suction, the decrease of pressure within the conveyer causing the atmospheric pressure to exert a propelling influence upon the material.

In the accompanying drawings, Figure 1 is a side view of my improved conveyer. Fig. 2 is a longitudinal sectional view; and Fig. 3 is a transverse sectional view on the line 3 3, Fig. 2.

Referring to the accompanying drawings, A is a tubular conveyer, being closed at the top and sides and having a series of openings *a* at the bottom. These openings are in the present instance narrow slots formed at an angle, so that the air entering the conveyer will not only lift the material, but will aid the suction apparatus to convey it along the trough. The bottom or bed of the conveyer may be made in sections, as in my former patents.

B is a hopper or other receptacle, which has a neck *b* leading to one end of the conveyer A, and this hopper may be provided with a valve or other suitable device for regulating the flow of material to the conveyer. At the opposite end of the conveyer is a suction-fan D of the ordinary construction and so connected to the conveyer and of such a capacity that it will produce a partial vacuum in the conveyer A, and the air entering the conveyer through the openings *a* will have sufficient force to carry the material along the tube in the direction of the arrow.

*a'* is the outlet-passage leading to a suitable receptacle or to another conveying apparatus, and *e* is a curved deflector, the portion *e'* being solid, while the portion $e^2$ is perforated to allow air to freely enter the suction apparatus. Some of the material will strike the solid portion *e'* of the deflector and will be directed by it through the opening *a'*.

It will be understood that any form of device may be used to feed the material to the conveyer and that any form of suction device may be used.

I claim as my invention—

1. The combination of a tubular conveyer having a series of openings in the bottom, an inlet and an outlet for the material, suction apparatus communicating with the conveyer at the discharge end, said suction apparatus acting to reduce the pressure in the conveyer-tube below atmospheric pressure, substantially as described.

2. The combination in a tubular conveyer having a series of openings therein and having an inlet and an outlet for the material, suction apparatus communicating with the outlet end of the conveyer, the said openings in the conveyer being inclined toward the outlet end, substantially as described.

In testimony whereof I have signed my name to this specification in the presence of two subscribing witnesses.

JAMES M. DODGE.

Witnesses:
WILL. A. BARR,
F. E. BECHTOLD.